United States Patent [19]

Shan et al.

[11] Patent Number: 5,546,571
[45] Date of Patent: Aug. 13, 1996

[54] METHOD OF RECURSIVELY DERIVING AND STORING DATA IN, AND RETRIEVING RECURSIVELY-DERIVED DATA FROM, A COMPUTER DATABASE SYSTEM

[75] Inventors: Ming-Chien Shan, Saratoga, Calif.; Hongjun Lu, Singapore, Singapore

[73] Assignee: Hewlett-Packard Company, Palo Alto, Calif.

[21] Appl. No.: 18,473

[22] Filed: Feb. 16, 1993

Related U.S. Application Data

[63] Continuation of Ser. No. 823,075, Jan. 14, 1992, abandoned, which is a continuation of Ser. No. 286,425, Dec. 19, 1988, abandoned.

[51] Int. Cl.$^6$ .................................................. G06F 17/30
[52] U.S. Cl. ...................................... 395/600; 364/DIG. 1
[58] Field of Search ................................................ 395/600

[56] References Cited

U.S. PATENT DOCUMENTS

| | | | |
|---|---|---|---|
| 4,128,891 | 12/1978 | Lin et al. | 364/900 |
| 4,514,826 | 4/1985 | Iwata et al. | 364/900 |
| 4,606,002 | 8/1986 | Waisman et al. | 364/200 |
| 4,823,310 | 4/1989 | Grand | 364/900 |
| 4,930,072 | 5/1990 | Agrawal et al. | 364/200 |
| 4,945,475 | 6/1990 | Bruffey et al. | 364/200 |
| 4,972,349 | 11/1990 | Kleinberger | 364/900 |
| 5,010,478 | 4/1991 | Perah | 364/200 |
| 5,021,943 | 6/1991 | Grimes | 364/200 |
| 5,050,071 | 9/1991 | Harris et al. | 364/200 |
| 5,062,074 | 10/1991 | Kleinberger | 364/900 |

OTHER PUBLICATIONS

Lu et al., "B$^{++}$-Tree: A New Access Method Supporting Least Fixpoint Computation of Recursive Relations", *Proceedings of the International Computer Science Conference*, Hong Kong, Dec. 1988.

Douglas Comer, "The Ubiquitous B-Tree," *Computing Surveys*, vol. 11, No. 2, Jun. 1979, pp. 121–137.

Nils J. Nilsson, *Problem Solving Methods in Artificial Intelligence*, 1971, McGraw-Hill Inc., pp. 48–53.

C. J. Date, *An Introduction to Database Systems*, Addison-Wesley Publishing Co., 1981, pp. 47–50.

H. F. McGaw, *Marginal Punched Cards in College and Research Libraries*, Scarecrow Press, 1952, pp. 14–89.

H. T. Geer, *Charging Systems*, American Library Association, 1955, pp. 110–121.

K. Allgeyer et al., "Expert System Based Configuration of VSAM Files", Third International Conference on Data Engineering, 5 Feb. 1987, pp. 150–156.

A. F. Cardenas et al., "Doubly-chained Tree Database Organisation–Analysis and design Strategies", The Computer Journal, vol.20, No. 1, 1977, pp. 15–26.

J. L. Bentley, "Multidimensional Binary Search Trees Used for Associative Searching", Communications of ACM, vol. 18, No. 9, Sep. 1975, pp. 509–517.

*Primary Examiner*—William M. Treat

[57] ABSTRACT

A structure and method of arranging recursively derived data items in a database. A set of hierarchical iteration levels, one for each iteration of the recursive relation from which the data items are derived, is provided and all data items derived during a given iteration are associated with the corresponding iteration level. Also provided is an index structure including an index set of non-leaf nodes, a sequence set of leaf nodes, and an iteration level index. The leaf nodes include a record of the iteration level of each data item. The data are globally linked according to iteration level or are clustered on pages which are linked according to iteration level. Highly efficient scan and search are implemented by utilizing the iteration level index and the record of iteration level in the leaf nodes to direct the scanning and searching to data generated during a single iteration. The least fixpoint of a set of mutually recursive relations is efficiently calculated by these methods.

18 Claims, 3 Drawing Sheets

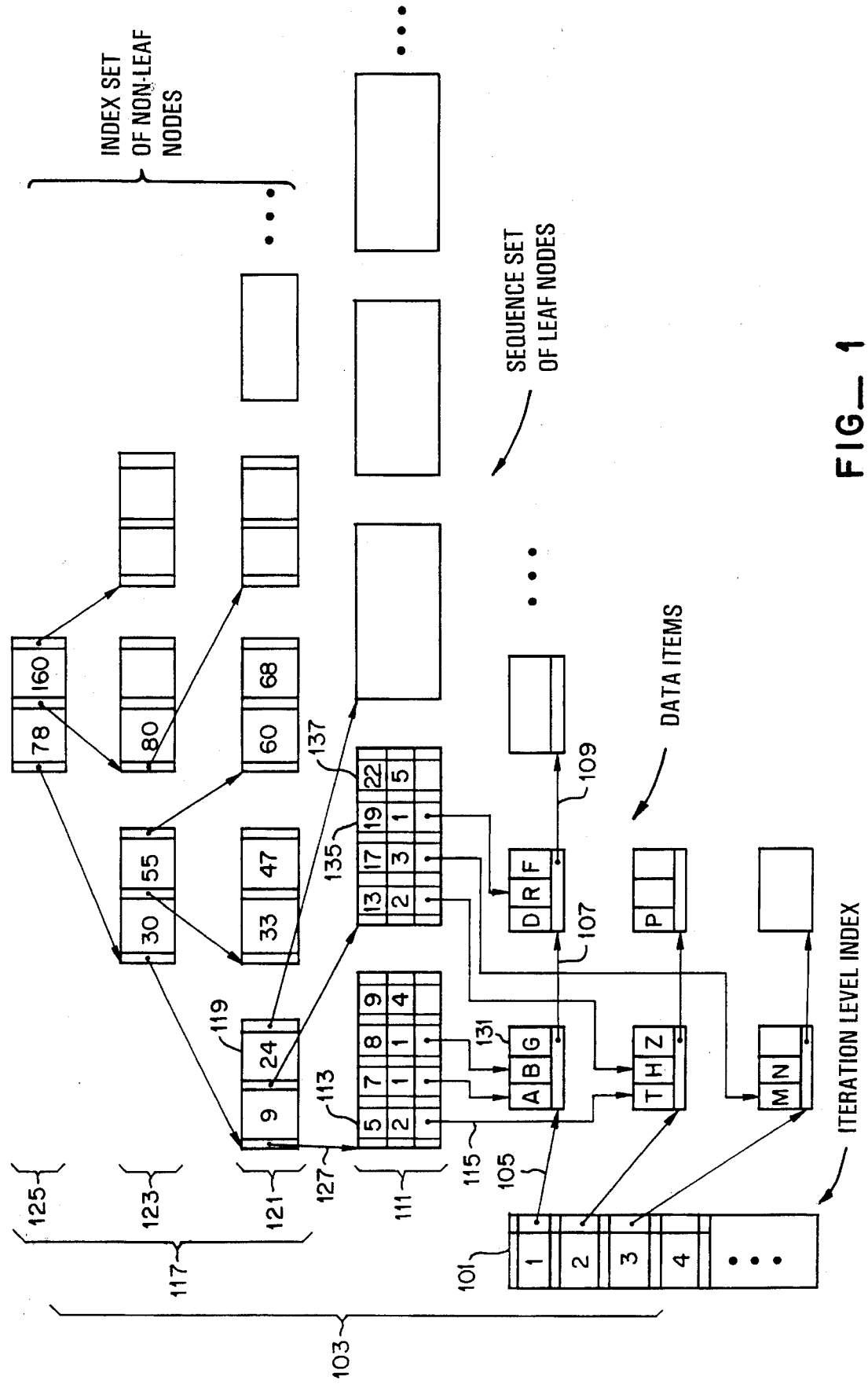
FIG_1

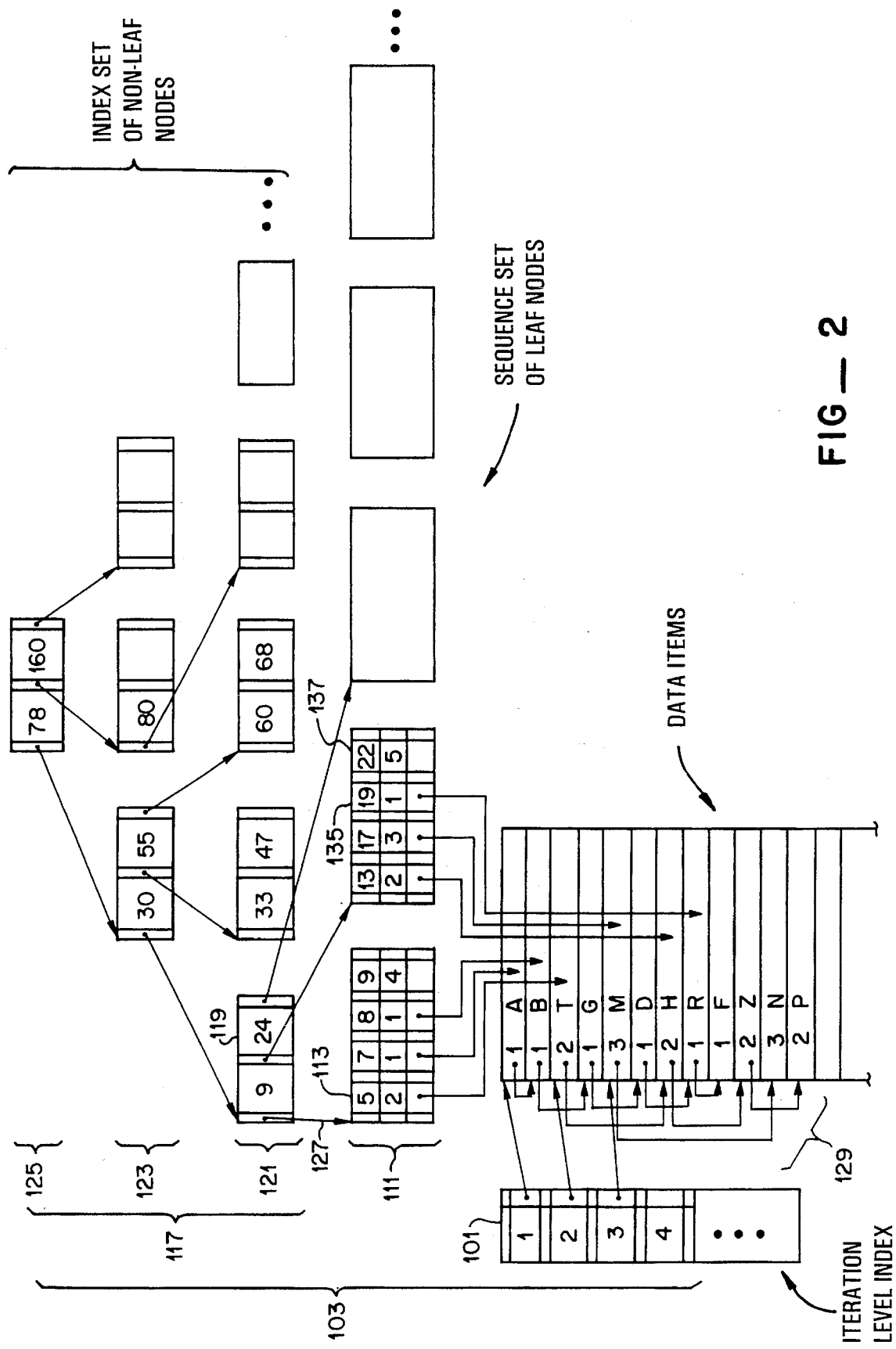
FIG—2

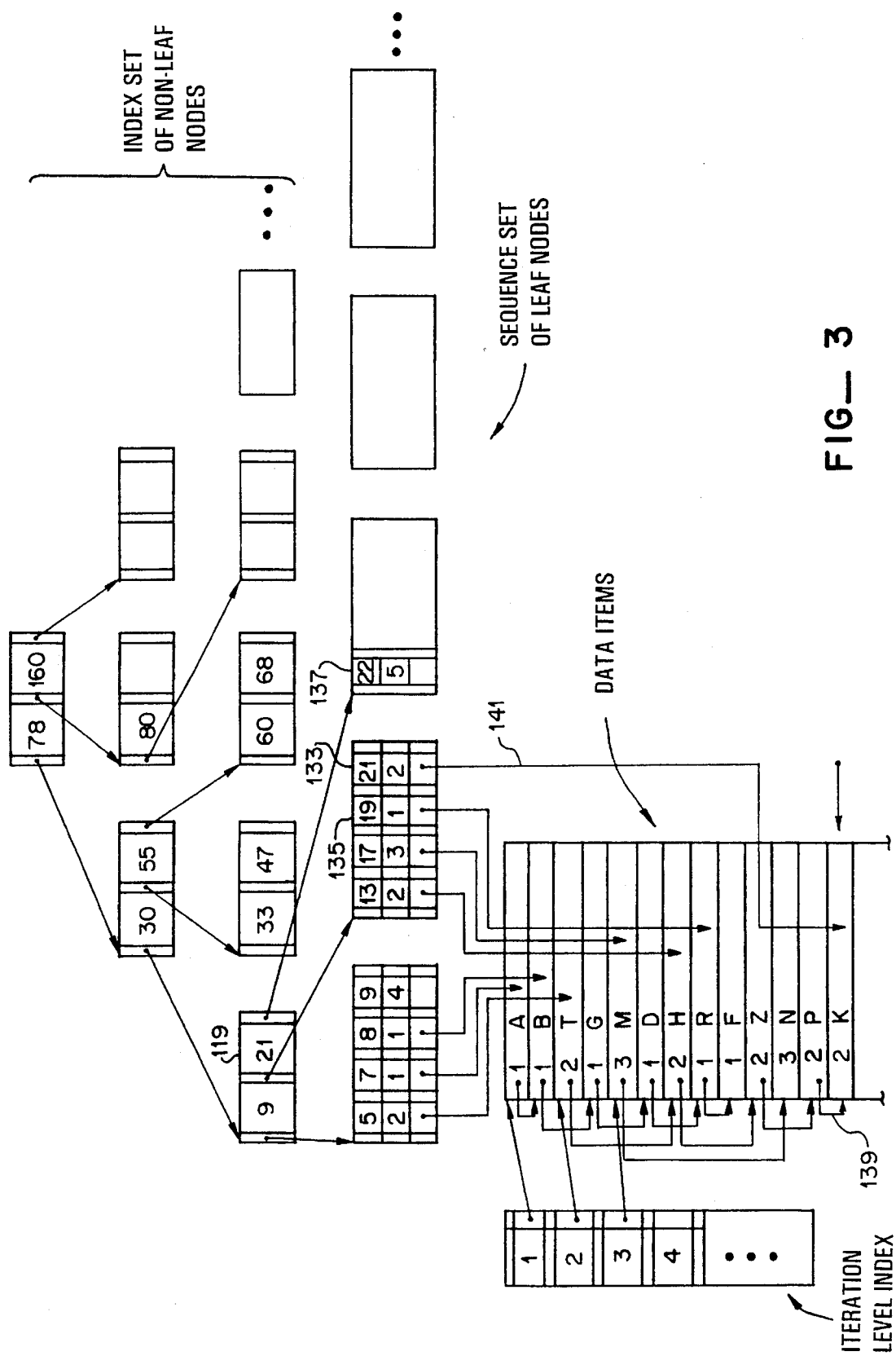
FIG—3

METHOD OF RECURSIVELY DERIVING AND STORING DATA IN, AND RETRIEVING RECURSIVELY-DERIVED DATA FROM, A COMPUTER DATABASE SYSTEM

CROSS-REFERENCE TO RELATED APPLICATIONS

This is a continuation of application Ser. No. 07/823,075 filed on Jan. 14, 1992, now abandoned which is a continuation of application Ser. No. 07/286,425, filed on Dec. 19, 1988, now abandoned.

BACKGROUND OF THE INVENTION

The present invention relates generally to computerized database systems and more particularly to a method of evaluating a recursive query of a database.

Database systems are being used to store and manage more and more different kinds of data. As the use of database systems has expanded and the quantities of data stored in a database have increased, much effort has been devoted to improving existing database systems and developing new systems with new and better capabilities.

To "query" a database means to request information from it. The requested information may be obtained directly by retrieving data items stored in the database or may be derived from data items stored in the database.

A kind of database query which has grown more important in recent years is a query which derives information recursively. Such a query can be described as a query which queries itself repeatedly. Deriving information recursively requires evaluating a recursive relation among the data items in the database. A general discussion of the mathematical concept of recursion can be found in J. Bradley, *Introduction to Discrete Mathematics*, ch. 6, Addison-Wesley 1988; see also E. Roberts, *Thinking Recursively*, John Wiley 1986.

For example, assume that a certain database contains a set of data items each expressing a parent-child relation. A few of such data items might be: Bill is father of Richard; Abigail is mother of Richard; Richard is father of Mary; Jane is mother of Mary; John is father of Andrew; Mary is mother of Andrew; and so on. Also assume that the names of the parents of a person are returned by a query of the form "FIND PARENTS OF [X]" where X is the name of the person whose parents are to be found. The name of a parent of a person is an example of the kind of information which is obtainable directly by retrieving a data item in this particular database.

Continuing with the above example, it will be noted that the database contains no information about grandparents. However, it will be apparent that such information can be recursively derived from the information in the database, for example by a query of the form "FIND PARENTS OF [FIND PARENTS OF [X]]". Providing the information requested by such a query involves evaluating the recursive relation of grandparent and grandchild.

Relations expressed by data items in modern databases are often far more complex than the above examples. For instance, a relation between an airline flight and a pair of cities would be expected to also include departure and arrival times, meal service, number of seats available, continuing service to other cities, fares, and so forth. Generating a trip itinerary to meet the needs of a passenger might require evaluating a number of recursive relations.

If the number of iterations required to evaluate a recursive relation is known in advance, then evaluating the relation is relatively straight-forward. For example, the request to find the grandparents of X requires exactly two iterations—one to find the parents of X and one to find the parents of the parents of X. However, if the number of iterations is not known, then the evaluation becomes far more difficult; an example of a request in which the number of iterations is not known is a request to find all ancestors of X.

As the volume of data in a database grows larger and the nature of the relations expressed by the data grows more complex, the time required for even a very powerful computer to respond to a complex query can become unacceptably long, especially when the number of iterations required to derive the response is not known in advance. Accordingly, the efficient evaluation of recursive relations has become a matter of critical importance in the design of modern database systems. A comprehensive survey of this problem is presented by F. Bancilhon and R. Ramakrishnan in "An Amateur's Introduction to Recursive Query Processing Strategies" in the *Proceedings of the ACM-SIGMOD Conference*, Washington, D.C., May 1986.

A set of mathematical operators collectively referred to as "relational algebra" has been developed for the manipulation of data items in a database (see generally C. J. Date, *An Introduction to Database Systems* (4th Ed.) Vol. I, ch. 13, Addison-Wesley 1986). The relational algebra affords many benefits and is widely used in modern data system design.

Evaluating a recursive relation r requires finding a "least fixpoint" of a recursive equation of the form $$r = f(r) \tag{1}$$

where f is a function which will be defined in a succeeding paragraph. The least fixpoint of the recursive relation r is defined as a relation r* which satisfies the following criteria:

$$r^* = f(r^*) \tag{2}$$

and $$r^* \subseteq p \text{ for any p satisfying the equation } p = f(p). \tag{3}$$

See A. Aho et al., "Universality of Data Retrieval Languages", *Proceedings of the Sixth POPL*, 1979.

The relational algebra does not support finding the least fixpoint of a recursive relation. Accordingly, new operators such as transitive closure operators have been proposed to give the relational algebra the ability to evaluate recursive relations (R. Agrawal, "Alpha: An Extension of Relational Algebra to Express a Class of Recursive Queries", *Proceedings of the Third International Conference on Data Engineering*, Los Angeles, Calif., Feb. 3–5, 1987; S. Ceri et al., "Translation and Optimization of Logic Queries: the Algebraic Approach", *Proceedings of the Eleventh International Conference on Very Large Data Bases*, Kyoto, Japan, August 1986).

Although not all recursive equations have least fixpoints, if the function f is monotone the equation is guaranteed to have a least fixpoint. A function f consisting only of relational algebra operations is monotone and therefore a recursive equation in which the function f consists only of relational algebra operations has a least fixpoint. See generally A. Tarski, "A Lattice-Theoretical Fixpoint Theorem and its Applications", *Pacific Journal of Mathematics*, vol. 5, no. 2, pages 285–309, June 1955.

To evaluate a pair of mutually recursive relations $r_1$ and $r_2$ requires finding the least fixpoints of the following recursive relational algebra equations:

$$r_1 = f_1(r_1, r_2) \qquad (4)$$

and $$r_2 = f_2(r_1, r_2) \qquad (5)$$

More generally, evaluating a set of n mutually recursive relations $r_1$ through $r_n$ requires finding the least fixpoints of a set of recursive equations of the form $$r_i = f_i(r_1, \ldots, r_n) \qquad (6)$$

The functions $f_i$ are defined in terms of the definitions of the recursive relations themselves. For example, two mutually recursive relations $r_1$ and $r_2$ are defined by the following Horn clauses:

$$r_1(X,Y) \leftarrow b_1(X,Z), r_2(Z,Y) \qquad (7)$$

$$r_2(X,Y) \leftarrow r_1(X,Z), b_2(Z,Y) \qquad (8)$$

$$r_1(X,Y) \leftarrow b_3(X,Y) \qquad (9)$$

where the b's are base relations and X, Y and Z are columns in the base relations. The functions $f_1$ and $f_2$ are then given by:

$$f_1(r_1,r_2) = b_3 \cup b_1 \circ r_2 \qquad (10)$$

$$f_2(r_1,r_2) = r_1 \circ b_2 \qquad (11)$$

where $\circ$ is a "composition operator" which is a join followed by a projection on the attributes in the target list.

More generally, a set of n functions $f_i$ are defined in terms of n mutually recursive relations $r_i$ as follows:

$$r_i = b_i^0 \cup b_i \circ r_1 \circ r_2 \circ \ldots \circ r_n \qquad (12)$$

where some of the $b^0$ may be empty but at least one must not be empty to guarantee that the computation will terminate. Some of the $b_i$ may be intermediate relations obtained from one or more other $b_i$.

There are various methods of computing the least fixpoint of a recursive equation in a database environment. One of these, the semi-naive method, provides good performance when used with appropriate optimizing techniques. F. Bancilhon et al., cited above; F. Bancilhon, "Naive Evaluation of Recursively Defined Relations" in Brodie and Mylopoulos (eds.), *On Knowledge Based Management Systems—Integrating Database and AI Systems*, pub. Springer-Verlag, 1985.

The semi-naive method of computing the least fixpoint is an iterative method. For a recursive relation r and a corresponding recursive equation $r=f(r)$, the semi-naive method iteratively computes new values of r satisfying the equation and inserts them into r during successive iterations until no new values of r can be found, as follows:

$$r^0 := \phi; \qquad (13)$$
$$\delta r^0 := f(\phi); \qquad (14)$$

$$j := 0; \qquad (15)$$
while $(\delta r^j \neq \phi)$ do
   begin
$$r^{j+1} := r^j \cup \delta r^j; \qquad (16)$$
$$\delta r^{j+1} := f(r^{j+1}) - f(r^j); \qquad (17)$$
$$j := j + 1; \qquad (18)$$
   end;

where $\delta r$ is a new value of r, $\phi$ is the empty set, and j is the variable of iteration.

To find the least fixpoints of a set of n mutually recursive relations $r_i$, a set of mutually recursive equations of the form of equation 6 must be evaluated together, as follows:

for each $r_i$ do
$$r_i^0 := \phi; \qquad (19)$$
for each $r_i$ do
$$\delta r_i^0 := f_i(\phi); \qquad (20)$$
$$j := 0; \qquad (21)$$
while (some $\delta r_i^j \neq \phi$) do
   begin
$$r^{j+1} := r^j \cup \delta r^j; \qquad (22)$$
$$\delta r^{j+1} := f_i(r_1^{j+1}, \ldots, r_n^{j+1}) - f_i(r_1^j, \ldots, r_n^j); \qquad (23)$$
$$j := j + 1; \qquad (24)$$
   end;

A differential approach to finding the least fixpoints of a set of n mutually recursive relations has also been proposed (I. Balbin et al., "A Differential Approach to Query Optimization in a Recursive Deductive Database", Technical Report 86/7, Department of Computer Science, University of Melbourne, Australia). This approach is described as follows:

(*Initialization*)
for each recursive relation $r_i$ do
   begin
$$r_i^0 := \phi; \qquad (25)$$
$$\delta r_i^0 := b_i^0; \qquad (26)$$
   end;
(*Iteration*)
$$j := 0; \qquad (27)$$
repeat
   for each recursive relation $r_i$ do
      begin
$$j := j + 1; \qquad (28)$$
$$r_i^j := r_i^{j-1} + \delta r_i^{j-1}; \qquad (29)$$
$$\Delta r_i^j := b_i \circ [\delta r_1^{j-1} \circ r_2^j \circ \ldots \circ r_n^j \qquad (30)$$
$$\cup r_1^{j-1} \circ \delta r_2^{j-1} \circ r_3^j \circ \ldots \circ r_n^j$$
$$\cup \ldots$$
$$\cup r_1^{j-1} \circ r_2^{j-1} \circ r_3^{j-1} \circ \ldots \circ \delta r_n^{j-1}$$
$$\delta r_i^j := \Delta r_i^j - r_i^j; \qquad (31)$$
   end;
until all $\delta r_i^j = \phi$ The above methods of finding a least fixpoint have been implemented in database environments by means of separate application programs.

From the foregoing, it will be appreciated that there is a need for a data structure and method for arranging recursively derived data items in a database in a way which provides efficient evaluation of recursive relations, especially if the relations are mutually recursive relations and if the number of iterations is not known in advance, by such means as the direct computation of least fixpoints without any need of separate application programs.

SUMMARY OF THE INVENTION

The present invention provides a data structure for recursively derived data items and a method of arranging such data in a computerized database system in a way which provides highly efficient evaluation of recursive queries without any requirement that the number of iterations be known in advance by such means as the direct computation of least fixpoints.

In a preferred embodiment of the invention, a database structure for recursively derived data items includes a plurality of hierarchical iteration levels, one for each iteration of a recursive relation from which the data items are derived; an index structure for indexing the data items; and means for linking together the various data items associated with each iteration level.

The index structure preferably includes a sequence set having a plurality of leaf nodes, an index set having a plurality of non-leaf nodes, and an iteration level index. The nodes of the sequence set are arranged sequentially in a bottom index level. Each node provides a reference between a pointer to one of the data items, a key value which uniquely identifies that data item, and the iteration level associated with that data item.

The nodes of the index set are arranged hierarchically to define a plurality of index levels above the bottom level, each level having fewer nodes than the level beneath it. Each node encompasses a range of the key values of the sequence set and all of the nodes on any level together encompass all of said key values. Each node provides an access path for each key value within its range to a node on the next lower level having said key value within its range.

The iteration level index provides a reference between each iteration level and a data item associated with that level.

In one embodiment each data item associated with a given iteration level is assigned to a page associated with that level and the pages of that level are chained together. In another embodiment the individual data items associated with a given iteration level are globally chained to each other.

A new data item is inserted by finding the existing data having the same iteration level and the closest key value, inserting the new item adjacent thereto, linking the new data item to the others having the same iteration level if the data items are globally linked, and adjusting the index and sequence sets to include a search path to the new item.

If the new data item has the same key value as an existing item, the new item is preferably discarded. Or, if the key values are the same the two items are compared and the new one is discarded only if they are identical. Either of these tests can be performed with minimal overhead during evaluation of the recursive relation, and if all data items derived during a given iteration are discarded then the iterations are stopped. Thus, an efficient test of when to stop iterations is provided if the number of iterations required to evaluate the recursive relation is not known in advance.

A set of data items arranged according to the invention can be searched very efficiently for a data item having an iteration level within a specified range by following an access path through the index set to the leaf node corresponding with the item being searched for, checking the iteration level of that item, and returning the item only if its iteration level is within the specified range.

The data may be scanned with high efficiency to find any data items satisfying a specified condition and having a specified iteration level by utilizing the iteration level index to locate a first data item having an iteration level within the specified range and then following the linking of the data items having that level until all such items have been scanned. Performing a scan in this manner provides the requested data items automatically arranged in order on the key value.

A nested loop join is easily performed by scanning a first set of data items at a specified iteration level; for each data item found during the scan, searching a second set of data items at a specified iteration level for a match, and joining each item found in the scan with any corresponding one found in the search.

Similarly, a merge scan join is accomplished by simultaneously scanning a first set of data items at a first iteration level and a second set at a second iteration level and joining any data item found in the first scan with any matching item found in the second scan.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is an illustration of a data structure according to the invention wherein the data are clustered by iteration level;

FIG. 2 is an illustration of a data structure like that of FIG. 1 but wherein the data are globally clustered; and FIG. 3 is an illustration of an insertion of a new data item into the data structure shown in FIG. 2.

DESCRIPTION OF THE PREFERRED EMBODIMENT

As shown in the drawings for purposes of illustration, the invention is embodied in a novel method of evaluating a recursive query of a computerized database, including a unique way of arranging recursively derived data in a computerized database system. There has been a need for a way to directly evaluate mutually recursive relations in a database especially if the number of iterations is not known in advance.

The structure and method of the invention provide a highly efficient way to evaluate mutually recursive relations by, for example, computing the least fixpoint of such relations. This permits the use of relational algebra techniques as augmented by newly-proposed operators and makes possible the efficient evaluation of sets of mutually recursive relations even if the number of iterations required for such evaluation is not known in advance.

As shown illustratively in the figures, a preferred embodiment of the invention provides a structure in a computerized database system for data items that have been recursively derived by the computer. This structure, in which for example data such as data items A, B, D, F, G, H, M, N, P, R, T, and Z are preferably stored, comprises a plurality of hierarchical iteration levels in a memory of the computer such as levels one through three as depicted in an iteration level index 101, one such level corresponding with each iteration of a recursive relation performed by the computer to derive the data items, all data items derived during a given iteration being stored in the memory and associated with the corresponding iteration level; an index structure generally designated 103 for indexing the data items; and linking entries in the memory such as pointers 105, 107 and 109 for linking the data items associated with each iteration level. This structure is dynamically constructed during the evaluation of the database.

The index structure 103 includes a sequence set 111 of leaf nodes such as the node 113 arranged sequentially to define a bottom index level of the structure, each such node comprising an entry in the memory that provides a cross-reference between a pointer such as the pointer 115 to one of the data items such as the data item T to which the pointer 115 points, a key value such as the value "5" which uniquely identifies that data item, and the iteration level such as the level "2" associated with that data item.

The structure 103 also includes an index set 117 of non-leaf nodes such as the node 119 arranged hierarchically to define a plurality of index levels such as the levels 121, 123 and 125 above the bottom index level of the structure, each level having fewer nodes than the level beneath it, each node comprising an entry in the memory that encompasses a range of the key values of the sequence set, all of the nodes on any level together encompassing all of said key values, each range encompassed by a node being included in the range encompassed by a node on the next higher level, each node providing for any key value within its range an access path such as the path depicted by an arrow 127 to a node on the next lower level having said key value within its range.

The structure 103 also includes the iteration level index 101 comprising a plurality of entries in the memory, each entry providing a reference between an iteration level and a data item in the memory associated with that level.

Tuples in a recursive relation can be either clustered or unclustered, similar to an ordinary relation in a database. However, the concept of level number leads to two types of clustering for recursive relations: level clustering and global clustering. "Level clustering" means that only tuples generated during a given iteration (or in other words tuples having the same level number) are ordered by any other attributes and that each data page contains only tuples generated during the same iteration.

"Global clustering" on the other hand means that all tuples are ordered on other attributes without regard to level number, and a data page typically will contain tuples generated during different iterations.

A "level number" tag is associated with each page if level clustering is used, whereas such a tag is attached to each item of data if global clustering is used. Pages or individual tuples, depending on which type of clustering is used, are chained together. The headers of these chains form an array structure (referred to above as the level index 101) which is a part of the overall structure.

The embodiment shown in FIG. 1 provides an example of level clustering. Each data item associated with a given iteration level is assigned to a page of memory such as the page 131 in FIG. 1, each page being associated with that iteration level. The linking entries comprise page chain references such as the arrows 105, 107 and 109 which link the pages associated with each iteration level.

The embodiment shown in FIG. 2 provides an example of global clustering. The linking entries comprise global chain references such as the arrows 129 in FIG. 2 which link data items associated with each iteration level.

The invention provides, in a computerized database system, a method of evaluating a recursive query of a database. The method includes storing in a memory of the computer a plurality of data items that have been derived recursively by the computer wherein the data are arranged according to the structure described above.

The structure for arranging the data is constructed during computation of the recursive relation. For convenience, this structure will sometimes be referred to herein as a "$B^{++}$ tree". Because the structure is created during the computation, the only update operation which is needed is insertion.

A new data item is inserted by identifying which of the data items associated with the iteration level of the new item has the closest key value to the key value of the new item, inserting the new data item into the database adjacent the identified data item, linking the new data item to the other data items associated with the iteration level of the new item, creating a new leaf node having a pointer to the new data item, inserting the new leaf node into the sequence set, and adjusting the index set to include a path to the new leaf node. The index set is adjusted in a manner similar to that used to adjust the index set of an ordinary B-tree as described, for example, in C. J. Date, *An Introduction to Database Systems* (4th Ed.), vol. 1, pages 63 through 67. If the data are clustered by iteration level, no linking is required other than assignment of the data item to a page of the correct iteration level because the pages corresponding with that iteration level are chained together.

The process of insertion of a new data item is illustrated in FIG. 3, wherein a new data item K has been added to the global data set 129. A new leaf node 133 has been created and stored in proper sequence between existing nodes 135 and 137, displacing the node 137 which has been moved one position to the right. The data item K has been chained to the item P of level 2 as indicated by an arrow 139 and the index tree has been adjusted as indicated by a changed value in the non-leaf node 119. A new pointer as indicated by an arrow 141 has been provided between the node 133 and the data item K.

Preferably duplicate items of data are discarded. This may be done by discarding the new data item if its key value is the same as the key value of the identified data item next to which it is to be placed. If desired, the two data items may be compared to be sure they are identical before the new item is discarded.

An advantage to eliminating duplicate data items is that iteration can be stopped if all the items generated during an iteration are discarded. This provides an efficient test for when to stop iteration if the number of iterations required to evaluate a recursive relation is not known.

The insertion process is preferably denoted by a function insert (r,t,j) which represents insertion of a tuple t generated during the j-th iteration into the $B^{++}$ tree indexed recursive relation r. The insert function consists of the following three steps.

First, check for duplication. Search the $B^{++}$ tree for any leaf notes on which t. key should appear. If any entry with the same key value is found, that is, if there is a possibility of duplication, the tuple already in the relation is retrieved. The two tuples are compared to determine if the new tuple to be inserted is a duplicate. The retrieve and compare operations need only be performed if the index attributes are non-key. If the new tuple is a duplicate, it is discarded and the second and third steps of the insert function are omitted.

Second, insert the new tuple. This step includes two tasks. One, find the data page on which the tuple should appear according to the clustering property and insert the tuple into an appropriate place in that data page. Two, insert the tuple into the level chain.

For a globally clustered relation, the data page can be located according to the key value. A new tuple is inserted in the level chain by locating the nearest tuple with the same level number in the same page, or in the previous page if there is none in the same page.

For relations with level clustering, the nearest index entry in the same index node or in a previous index node with the same level number is searched to locate the data page for insertion of the tuple. The tuple is inserted into the level chain automatically because the data pages of the same level are chained together.

The third step is to insert an index entry for the new tuple. This is done by creating a leaf index entry (t.key, data_ptr, j) for the tuple, where data_ptr is a pointer to the tuple. If there is space on the leaf node, the index entry is inserted. If not, the node is split in a similar manner as would be done in the case of an ordinary B-tree.

The invention provides a highly efficient computerized method of searching data items which have been arranged as described to find a data item having a specified key value and an iteration level within a specified range. This search method comprises selecting an access path in the memory from the paths provided by the non-leaf nodes to locate a leaf node associated with the specified key value; determining whether the iteration level associated with said leaf node is within the specified range; and returning the data item associated with said leaf node only if said determination is affirmative.

The invention also provides a very efficient computerized method of scanning a set of data items to find any which satisfy a specified condition and have a specified iteration level. This method comprises utilizing the iteration level index to locate in the memory a first data item associated with that iteration level, following the linking of the data items to locate the other data items associated with that iteration level, examining each located data item in sequence to determine whether it satisfies the prescribed condition, and if the examined item satisfies the prescribed condition, retrieving the item, the items retrieved during the scan being arranged in sequential order according to their key values.

More particularly, the $B^{++}$ tree provides a mechanism for sequential scan by chaining the leaf nodes together. The $B^{++}$ tree also provides a similar but more powerful mechanism of sequential scan over the entire relation or only a part (tuples of certain levels of iteration); this capability is highly desirable in the computation of the least fixpoint. The sequential scan function is defined as seq_scan (r, start_level, end_level) where r is the indexed relation and start_level and end_level define the range of the searching operation. If the start and end levels are equal, the scan is a single level scan, otherwise it is a multi-level scan. If level clustering is used, multi-level scanning is preferably carried out level by level by means of the iteration level index so that each data page need only be fetched from storage once. In tact, a primary reason for having the level index is to provide efficient scan over the tuples generated in an iteration. There is no total ordering among all the tuples returned because the tuples are returned level by level. Both single level scans and sequential scans on globally clustered relations return tuples in index key order.

The above search and scan techniques can be combined to perform join operations such as nested loop joins and merge scan joins. The ability to perform such joins is what gives the invention the ability to efficiently evaluate least fixpoints.

The semi-naive method of least fixpoint computation has been chosen because previous research indicates that this method gives reasonable performance in recursive query processing when used together with appropriate optimization strategies. See, for example, Bancilhon, F., and Ramakrishnan, R., "An Amateur's Introduction to Recursive Query Processing Strategies," *Proceedings of ACM-SIGMOD Conference,* Washington, D.C., May 1986. As described above in equations 25–31 and the associated text, the basic operations during each iteration of the semi-naive evaluation are: n-way joins among all involved recursive relations (different portion) and union of the results to obtain new tuples for this iteration; set difference to eliminate duplicates from the results, that is, toss away the tuples which are already in the result relation; and union of those "really" new generated tuples with the previous results. As the following discussion illustrates, the $B^{++}$ tree provides an efficient access method to implement these operations.

The set difference operation and union of the results as required by the semi-naive method are in fact a by-product of constructing a $B^{++}$ tree for a relation r. First, during the j-th iteration, if a tuple is a duplicate (that is, if the same tuple has been generated during a previous iteration) it will not be inserted into the recursive relation at all (step one in the insertion procedure). Second, after tuples generated in the j-th iteration are inserted, the relation contains all tuples generated up to the j-th iteration. Therefore, insertion of tuples generated in the j-th iteration actually performs the operations:

$$(\Delta r_i^j - r_i^j) \cup r_i^j$$

as in the notation of equations 25–31.

In fact, by dynamically constructing a $B^{++}$ tree for the relation r, there is no need to keep the notion of temporary relations at all, since $r^j$ and $\delta r^j$ are all implemented through one $B^{++}$ tree: $r^j$ in fact consists of the tuples with level numbers less than or equal to j−1 and $\delta r^j$ the tuples of level j. For convenience a superscript in the form of (i,j) of r is used to denote a portion of recursive relation r. With this notation, $r^{(i,j)}$ represents the tuples of level j, which is generated in iteration j ($\delta r^j$ in the notation of equations 25–31 and $r^{(0,j-1)}$ is equal to $r^j$ which is the result relation at the start point of iteration j. It is assumed that $r^{(0,k)}$ for k<0 is empty, which is the initial value of relation r. Thus, $r_1^{(j-1,j-1)} \circ r_2^{(0,j-1)}$ is a composition between $\delta r_1^{j-1}$ and $r_2^j$ using the notation of equations 25–31.

A computerized method of performing a nested loop join according to the invention comprises scanning a first set of the data items to find any data items satisfying a specified condition and having a specified iteration level, for each data item found in the preceding step, searching a second set of the data items to find any data items having a key value corresponding with the key value of said data item and a specified iteration level, and joining each data item found in the scan with any corresponding data item found in the search.

One of the important join methods used in relational database management systems is the nested loops join. Using this method to join two relations, one relation (the "outer" relation) is sequentially scanned. For each tuple returned, another relation (the "inner" relation) is searched for matching tuples, that is, any tuples having attribute values that satisfy the join conditions. If the inner relation has an index on the join attributes, the searching will be quite effective. If a B-tree index is used and if the index is clustered, the search of matching tuples typically can be expected to incur only about (h+1) disk accesses, where h is the height of the tree. In most cases the height of a B-tree index is not very large even for large relations. Furthermore, the top levels of a B-tree are often kept in memory to reduce the number of disk accesses. Therefore, the nested loops join using an index is a highly efficient join method.

The $B^{++}$ tree can be considered in one sense as an extension of a B-tree index, and in particular the $B^{++}$ tree has the same property when used in a nested loops join. If a $B^{++}$ tree indexed relation is used as the inner relation in the join, a "find tuple" function is preferably used to find the matching tuples.

Basic searching in a $B^{++}$ tree is defined as the find tuple function find_tuple (r, key_val, start_level, end_level), where r is the indexed relation, key_value is the attribute value to be searched for, and start_level and end_level define the range of the searching operation. This range defines a portion of the recursive relation corresponding to the tuples generated during iterations start_level to end_level of the LFP computation. The function returns the tuples with the search key value. The searching procedure is similar to that of an ordinary B-tree search in that pointers are followed down the $B^{++}$ tree looking for the given key_val. When a leaf index entry having that key value is found, its level number field is checked; the tuple is returned only if its level number is in the search range.

If the relation is used as the outer join, the function seq_scan (defined previously) is used to sequentially scan the specified portion of the relation. The following procedure illustrates an implementation of nested loops join between portions of two recursive relations using the $B^{++}$ tree:

```
procedure NL_B++_Join (outer(j0, j1), inner(k0, k1));
begin
        for each tuple t_outer returned by seq_scan (outer, j0, j1) do
            begin
                t_inner := find_tuple (inner, t_outer.key_val, k0, k1);
                t := merge (t_outer, t_inner);
                output (t);
            end;
end
```

A computerized method of performing a merge scan join according to the invention comprises simultaneously scanning a first set of data items having a first specified iteration level and a second set of data items having a second iteration level, and joining any data item found in the scan of the first set with any matching data item found in any scan of the second set. In essence, the first scan pauses at each item during its scan and the second scan advances until no matches are found. Because the data in both sets are arranged in order by key value, only a single pass through each set is required to complete the merge scan operation.

A merge-scan join is another commonly-used join method in relational database management systems. This method requires that tuples of two source relations be retrieved according to the join attributes' order. One way this can be done is to sort the relations. The two relations are then scanned simultaneously and tuples from both relations that satisfy the join conditions are merged together to form result tuples.

If the two source relations are clustered on join attributes, the tuples are already ordered and the merge-scan join can be applied without first sorting. The join can be accomplished by reading the data pages sequentially and merging the matching tuples together. The number of disk accesses is roughly equal to the total number of pages of the two relations.

For relations with level clustering, there is no total ordering among all tuples. However, the merge join can be applied repeatedly between levels because the tuples are ordered within a level. In other words, the merge scan method is modified into a hybrid method that includes nested looping through levels and applying the merge scan method within each level. This is illustrated as follows:

```
procedure SM_B++_Join (outer(j0, j1), inner(k0,k1));
begin
        for j_level := j0 to j1 do
            for k_level := k0 to k1 do
                begin
                    seq_scan (r1, j_level, j_level);
                    seq_scan (r2, k_level, k_level);
                    merge and output matching tuple pairs returned
                        by two scans;
                end;
end
```

The $B^{++}$ tree implementation of the semi-naive method for the least fixpoint computation of recursive relations can be summarized in the following algorithm. In this algorithm the function $B^{++}$_Join is either NL_$B^{++}$_Join or SM_$B^{++}$_Join, as defined above, or a combination thereof.

```
(*Initialization*)
j := 0;
for each recursive relation r_i do
    begin
        r_{i_0} := φ;
        insert (r_i, t∈b_0, 0);
    end;
(*Iteration*)
repeat
    j := j+1;
    for each recursive relation r_i do
        begin
            T := π_{r_i,all} B++_Join (b_i, r_1^(j-1, j-1), r_2^(0, j-1),..., r_n^(0, j-1));
            insert (r_i, t∈T, j);
            T := π_{r_i,all} B++_Join (b_i, r_1^(0, j-2), r_2^(j-1, j-1),..., r_n^(0, j-1));
            insert (r_i, t∈T, j);
            . . .
            . . .
            T := π_{r_i,all} B++_Join (b_i, r_1^(0, j-2), r_2^(0, j-2),..., r_n^(j-1, j-1));
            insert (r_i, t∈T,j);
        end;
until no tuple inserted into any r_i;
```

This algorithm shows that the computation consists of n composition operations and insertions during each iteration, where n is the number of recursive relations evaluated together. The intermediate relation T is used for convenience in showing how the algorithm works, but in an actual implementation there is no need to create a physical relation T. The tuples generated by each join are inserted into relation $r_i$ directly.

The LFP evaluation according to the above algorithm involves a large number of selection, projection and join operations. Therefore, query optimization is an important means of improving performance.

It is necessary to construct a $B^{++}$ tree to carry out the above algorithm. In conventional database systems, the use of an index for a join results from query optimization. In the above algorithm, at least one $B^{++}$ tree must be constructed for each recursive relation. Therefore, an important optimization problem is to determine the number of $B^{++}$ trees to be built for a particular recursive relation and to choose the attributes on which the $B^{++}$ indices are constructed.

In conventional database systems, tables are often indexed to improve query performance. These indices are usually constructed prior to execution of user queries. Therefore the query optimizer does not consider the cost of building the indices unless the indices are constructed during query processing. Some systems, for example System R, do not support indexing on intermediate tables.

In contrast, in the present invention the $B^{++}$ tree is a run-time data structure and therefore the cost associated with building the $B^{++}$ tree should be taken into consideration when optimizing recursive queries. It is therefore reasonable to expect that the minimum possible number of $B^{++}$ trees will be constructed for a recursive relation.

For example, assume three recursive relations $r_1$, $r_2$ and $r_3$ and the following rule that defines $r_1$:

$$r_1(X,Y,Z) \leftarrow r_1(X,Y), r_2(Y,Z), r_3(X,Z)$$

These three recursive relations must be evaluated in one LFP operation. It would seem that two indices would be needed for $r_3$ on X and Z, respectively, if the index join method is to be used because the relation $r_3$ has two join attributes: X with $r_1$ and Z with $r_2$. However, only a single $B^{++}$ tree for $r_3$, either on X or on Z, is enough to evaluate the right-hand side of the rule. With a $B^{++}$ tree on X for $r_3$ and appropriate $B^{++}$ trees for $r_1$ and $r_2$, the three-way join can be computed as follows:

(a) open a sequential scan on $r_1$, (b) for each tuple t returned by the scan, use t.X and t.Y to search $r_2$ and $r_3$ for a matching tuple using the $B^{++}$ index, and (c) comparing any matching tuples returned from $r_2$ and $r_3$ on attribute Z to generate the final result.

The index can be constructed on Z or on the second attributes of $r_3$. This will result in the following join sequence:

(a) open a sequential scan on $r_1$, (b) for each tuple t returned by the scan, use t.Y and the $B^{++}$ tree of $r_2$ to search $r_2$ and return any matching tuples $t_2$, and (c) sue the $B^{++}$ tree on $r_3.Z$ to search $r_3$ for matching tuples and merge them with $t_1$ and $t_2$ to generate the join result.

This shows that the $B^{++}$ tree brings a new factor to recursive query optimization: selecting the indexing attributes. If the optimal plan as determined by the query optimizer requires construction of a secondary index for a recursive relation, the insertion operation will still be through the original $B^{++}$ index to keep the clustering property.

Using the $B^{++}$ tree, rather than the naive and semi-naive methods as described previously, to implement the LFP computation in a query such as a request to find all ancestors of a person can eliminate any need to construct temporary tables and thus any need to manage such tables. The $B^{++}$ tree also reduces any need for checking termination conditions because the $B^{++}$ index supports a fast search for duplicates.

The $B^{++}$ tree further reduces the cost of evaluating a recursive relation in a query such as an ancestor query. Most relations in the recursive equations required in an ancestor query are intermediate relations. No indices or other access methods exist to support join operations on these intermediate relations, and building a temporary index in every iteration would be quite expensive. The $B^{++}$ tree provides each recursive relation an efficient access path to support the processing of the right-hand sides of recursive relations. Thus, the execution time required to evaluate the recursive relations will be significantly reduced.

From the foregoing it will be appreciated that the data structure and method of the invention provide a way to efficiently respond to complex database queries. A set of recursive relations is evaluated, for example by computing the least fixpoints of the relations, with a minimum of overhead even if the number of recursions required to perform the evaluation is not known in advance.

One of the unique features of the access method according to the invention is that it provides a uniform way to store and access a relation which is dynamically growing during the recursive processing. It provides the ability to access part of such a relation through one access path, thereby eliminating any need for creating and maintaining a number of temporary relations. It also eliminates the traditionally expensive set difference operations which are realized when tuples are inserted into the relation. This new access method represents an important step towards including the least fixpoint computation as one of the basic database operations for manipulating data.

Another advantageous property of the invention is the compatibility of the $B^{++}$ tree index with the ordinary B-tree index which is widely implemented in relational database management systems. For example, if a default rule specifies that searching an index requires searching through all tuples in a relation without specifying a level number, a typical query processing algorithm in an existing database management system need not change if the system is augmented with the new $B^{++}$ tree access method. This compatibility makes the $B^{++}$ tree attractive for implementing the whole function LFP operator or $\alpha$ operator where these operators are often used together with the traditional relational operators such as projection, selection and join to answer user queries.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. In a computerized database system, a method of deriving data and storing the derived data in a memory of the computer, the method comprising:

deriving new items of data for storage in the memory by iteratively evaluating a database query that receives itself as an argument a plurality of times according to a recursive relation;

associating storage locations in the memory with a plurality of hierarchical iteration levels, one such level corresponding with each iteration of the recursive relation performed by the computer to derive the new data items;

storing all data items derived during a given iteration in locations associated with the corresponding iteration level;

reserving a plurality of memory locations to form a sequence set having a plurality of leaf node locations arranged sequentially to define a bottom index level of an index structure;

for each newly derived data item, entering in a leaf node location of the sequence set a cross-reference between a pointer to that data item, a key value which uniquely identifies that data item, and the iteration level associated with that data item;

reserving a plurality of memory locations to form an index set having a plurality of non-leaf node locations arranged hierarchically to define a plurality of index levels above the bottom index level of the index structure, each level having fewer nodes than the level beneath it;

assigning each node a range of the key values of the sequence set such that all of the nodes on any level together encompass all of said key values, each range encompassed by a node is included in the range encompassed by a node on the next higher level, and each node provides for any key value within its range an access path to a node on the next lower level having said key value within its range;

reserving a plurality of memory locations to form an iteration level index to provide a reference between each iteration level and a data item associated with that level; and linking the data items associated with each iteration level by storing references in the memory between the data items.

2. A method according to claim 1 wherein linking the data items comprises globally chaining the data items associated with a given iteration level.

3. A method according to claim 2 and further comprising inserting a new data item into the database by:

identifying which of the data items associated with the iteration level of the new item has the closest key value to the key value of the new item;

storing the new data item in a memory location adjacent the identified data item;

linking the new data item to the other data items associated with the iteration level of the new item;

creating a new leaf node having a pointer to the new data item;

storing the new leaf node in the sequence set; and adjusting the index set to include a path to the new leaf node.

4. A method according to claim 3 and further comprising discarding the new data item if its key value is the same as the key value of the identified data item.

5. A method according to claim 4 and further comprising stopping iteration of the recursive relation if all the items generated during an iteration are discarded.

6. A method according to claim 3 and further comprising discarding the new data item if it is identical to the identified data item.

7. A method according to claim 6 and further comprising stopping iteration of the recursive relation if all the items generated during an iteration are discarded.

8. A method according to claim 1 and further comprising assigning each data item associated with a given iteration level to a page of memory associated with that iteration level.

9. A method according to claim 8 wherein linking the data items comprises chaining the pages associated with a given iteration level.

10. A method according to claim 9 and further comprising inserting a new data item by:

identifying which of the data items associated with the iteration level of the new item has the closest key value to the key value of the new item;

assigning the new data item to a page of memory associated with the iteration level of the new item at a location adjacent the identified data item;

creating a new leaf node having a pointer to the new data item;

inserting the new leaf node into the sequence set; and adjusting the index set to include a path to the new leaf node.

11. A method according to claim 10 and further comprising discarding the new data item if its key value is the same as the key value of the identified data item.

12. A method according to claim 11 and further comprising stopping iteration of the recursive relation if all the items generated during an iteration are discarded.

13. A method according to claim 10 and further comprising discarding the new data item if it is identical to the identified data item.

14. A method according to claim 13 and further comprising stopping iteration of the recursive relation if all the items generated during an iteration are discarded.

15. A computerized method of searching a set of data items arranged according to the method of claim 5 to find a data item having a specified key value and an iteration level within a specified range, the method comprising the following steps carried out automatically by the computer:

selecting an access path in the memory from the paths provided by the non-leaf nodes to locate a leaf node associated with the specified key value;

determining whether the iteration level associated with said leaf node is within the specified range; and returning the data item associated with said leaf node only if said determination is affirmative.

16. A computerized method of scanning a set of data items arranged according to the method of claim 1 to find any data items satisfying a specified condition and having a specified iteration level, the method comprising the following steps carried out automatically by the computer:

utilizing the iteration level index to locate in the memory a first data item associated with that iteration level;

following the linking of the data items to locate in the memory the other data items associated with that iteration level;

examining each located data item in sequence to determine whether it satisfies the prescribed condition; and if the examined item satisfies the prescribed condition, retrieving the item from memory, the items retrieved during the scan being arranged in sequential order according to their key values.

17. A computerized method of performing a nested loop join in a computerized database system wherein data items have been arranged according to the method of claim 1, the method comprising the following steps carried out automatically by the computer:

scanning a first set of the data items to find any data items satisfying a specified condition and having a specified iteration level;

for each data item found in the preceding step, searching a second set of the data items to find any data items having a key value corresponding with the key value of said data item and a specified iteration level; and joining each data item found in the scan with any corresponding data item found in the search.

18. A computerized method of performing a merge scan join in a computerized database system wherein data items have been arranged according to the method or claim 1, the method comprising the following steps carried out automatically by the computer:

simultaneously scanning a first set of data items having a first specified iteration level and a second set of data items having a second iteration level; and joining any data item found in the scan of the first set with any matching data item found in any scan of the second set.

* * * * *